United States Patent
Oslund

(10) Patent No.: US 9,306,810 B2
(45) Date of Patent: *Apr. 5, 2016

(54) WIFI ZAPPER SMART PHONE APPLICATION

(71) Applicant: WiFiZapper, Inc., Selma, AL (US)

(72) Inventor: Michael Oslund, Selma, AL (US)

(73) Assignee: WiFiZapper, Inc., Selma, AL (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/915,248

(22) Filed: Jun. 11, 2013

(65) Prior Publication Data

US 2013/0331083 A1    Dec. 12, 2013

Related U.S. Application Data

(60) Provisional application No. 61/657,963, filed on Jun. 11, 2012.

(51) Int. Cl.
| H04L 12/24 | (2006.01) |
| H04W 12/08 | (2009.01) |
| H04W 48/02 | (2009.01) |
| H04W 84/12 | (2009.01) |

(52) U.S. Cl.
CPC ............... *H04L 41/22* (2013.01); *H04W 12/08* (2013.01); *H04W 48/02* (2013.01); *H04W 84/12* (2013.01)

(58) Field of Classification Search
CPC ........ H04W 48/04; H04W 48/02; G06F 7/04; G06F 9/00; H04L 41/22
USPC ................ 455/418, 419, 420, 41.2, 410, 411; 370/388, 352; 726/16, 17; 713/168, 713/169, 170
See application file for complete search history.

(56) References Cited

U.S. PATENT DOCUMENTS

| 7,496,754 | B2 | 2/2009 | Liu et al. | |
| 7,886,033 | B2 * | 2/2011 | Hopmann et al. | 709/223 |
| 8,179,872 | B2 | 5/2012 | Bienfait et al. | |
| 8,649,297 | B2 * | 2/2014 | Ahlers et al. | 370/255 |
| 8,782,741 | B1 * | 7/2014 | L'Heureux et al. | 726/3 |
| 2006/0236376 | A1 * | 10/2006 | Liu | H04L 63/08 726/4 |
| 2007/0130286 | A1 * | 6/2007 | Hopmann | H04L 63/06 709/217 |
| 2012/0159165 | A1 | 6/2012 | Schibuk | |
| 2013/0067564 | A1 * | 3/2013 | Fok Ah Chuen et al. | 726/17 |
| 2013/0326047 | A1 * | 12/2013 | Easty | 709/224 |

OTHER PUBLICATIONS

Mom's Internet Access helper (MIA), http://www.avidz.net/mia, copyright © 2005 Avidz LLC.
Mydink Lite, http://itunes.apple.com/us/app/mydlink-lite, copyright © 2011 Apple Inc.
Device Monitr by Xoriant Corp, https://itunes.apple.com/us/app/device-monitr, copyright © 2013 Apple Inc.
Checking the Router's Wireless Settings Using an Android Tablet, http//www6.nohold.net, copyright © 2012 Cisco Systems, Inc.

* cited by examiner

*Primary Examiner* — Christopher M Brandt
(74) *Attorney, Agent, or Firm* — Blank Rome LLP

(57) ABSTRACT

A method and system for disabling traffic from a specific device or devices on a WiFi network via a remote script or other action. In one embodiment, the method is implemented as an application that executes on a device such as a smart phone (e.g., IOS iPhone, Android operating system device) or tablet (e.g., iPad).

16 Claims, 2 Drawing Sheets

WIFI ZAPPER SMART PHONE APPLICATION

RELATED APPLICATION(S)

The present disclosure claims priority to Provisional Application 61/657,963 filed Jun. 11, 2012, which is incorporated herein by reference in its entirety for all purposes.

FIELD OF THE INVENTION

Embodiments of the invention relate to a method and system for managing a wireless connection (WiFi) or router remotely from a device such as a smart phone (e.g., IOS iPhone, Android operating system device) or tablet (e.g., iPad).

BACKGROUND

More and more devices, including game consoles, computers, and laptops to name a few, utilize wireless bandwidth. This can become problematic when the devices are all accessing the same WiFi network. Accordingly, there is a need to control a WiFi router to disable traffic from a specific device or devices on the WiFi network via a remote script or other action.

SUMMARY

The present disclosure provides a method and system for disabling traffic from a specific device or devices on a WiFi network via a remote script or other action. In one embodiment, the method is implemented as an application that executes on a device such as a smart phone (e.g., IOS iPhone, Android operating system device) or tablet (e.g., iPad).

DETAILED DESCRIPTION

The present disclosure provides router control for mobile and other devices. That is, the disclosure provides a "WiFi manager."

The application has the ability to log into a wireless (WiFi) network router in order to disable/enable traffic from a specific device on the network via a remote action. This action will be run from a mobile device running the application, such as an iOS iPhone/iPad or Android operating system device.

Using the native iOS/Android development languages the application utilizes reconstructed POST form data to login to administrative control pages. The application controls the MAC address filter on the wireless router and updates the settings pages to save changes inside the wireless router's administration panel.

On initial launch of the application, the application scans the network it is connected to and displays the wireless router's name. The application requests the user to enter the wireless router's administrative login name and password. The application then displays the list of devices on the wireless network. Devices on the network can be named by the user for easy reference. The user creates a "white list" for the wireless router to allow incoming connections from certain devices such as an Xbox, Kindle, an iPad or iPod, among others. Devices will have to be added to the "white list" during the application set up phase; if the user wants to turn a device off of the wireless network, the user takes them off the white list inside the router by clicking on its name in the device list on the application. To re-enable the device, the user simply clicks on the device name once again.

Figure 1:
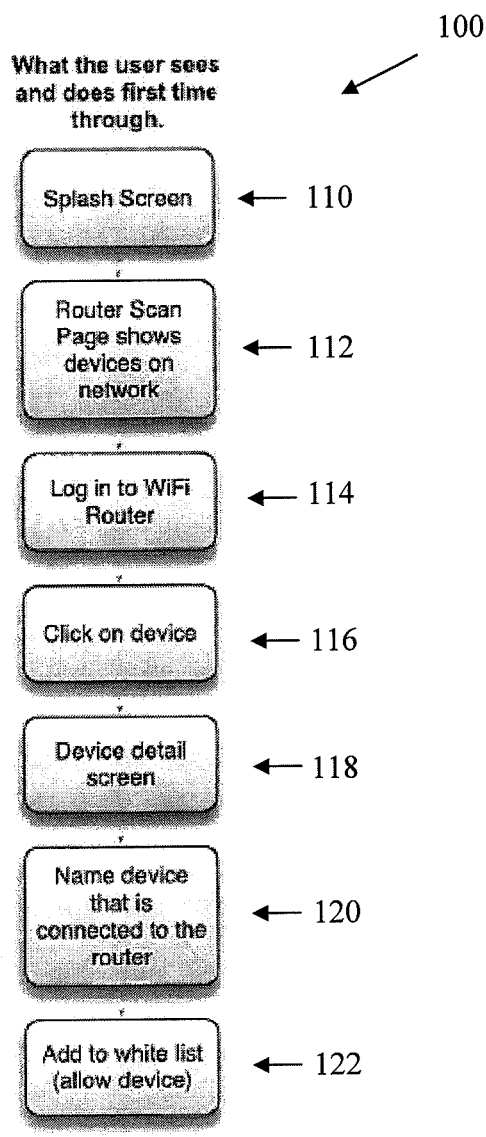
FIG. 1 illustrates an example of what the user sees and does the first time through the disclosed method in accordance with the present disclosure.

FIG. 1 illustrates a method 100 of the present disclosure and the steps taken by a user upon initially starting the system. First a user enables the system (not shown) for instance by selecting an icon via a touch screen or other user interface. Then at step 110 the system displays a splash screen, such as a screen showing the system's logo and/or other information. During start up, for instance while the splash screen is displayed at step 110, the system scans the network to locate connected devices. This can include locating one or more routers available to be controlled or may involve identifying devices connected to a preconfigured router. At step 112 the system displays devices available on the network to the user and allows the user to select a particular device, such as a router to connect to and control. For clarity the controlled device is referred to herein as a router (to distinguish it from devices connected to the router), but it can be any device facilitating a connection to one or more other devices. This step can be skipped if the system is preconfigured to control a particular router. Once the user has selected a router to control, at step 114 the system allows the user to login to the router by receiving login information such a username and password, biometric data, or other identifying data.

After step 114, the system displays a list of devices connected to the router. At step 116 the user can select a particular device for instance by selecting an icon via a touch screen or other user interface. Then at step 118 a device detail screen is displayed showing information about the selected device. At step 120 the user can give the device a name to identify it such as Suzie's PC or Tim's iPad Mini. Finally, at step 122 the system allows the user to add the device to the white list, meaning it is allowed to connect to the network via the router. This initialization process is only necessary upon initial login or to allow a new device to connect to the router that has not previously been added to the white list.

Figure 2:
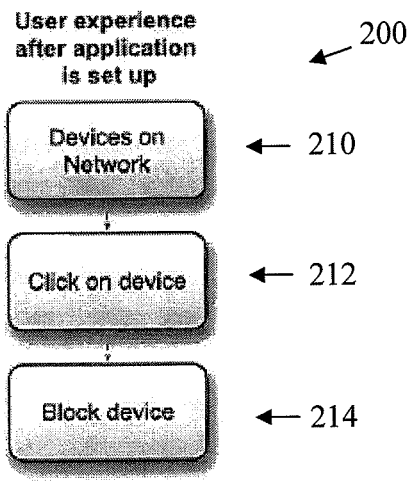
FIG. 2 illustrates an example of the user experience after the method (implemented via a smartphone, tablet or other WiFi enabled device) is initially set up for use in accordance with the present disclosure.

FIG. 2 illustrates a method 200 of the present disclosure and the steps taken by a user while using the system after the initial set up is complete. At step 210 the system displays a list of devices connected to the router. At step 212 the user can select a device. Then at step 214 the user can block the selected device. It is also possible to allow access to a previously blocked device by the same process of selecting the device and unblocking it (as opposed to blocking it). The blocking and unblocking can be achieved via a simple toggle mechanism, such as a slider or on/off button in the system.

Figure 3:
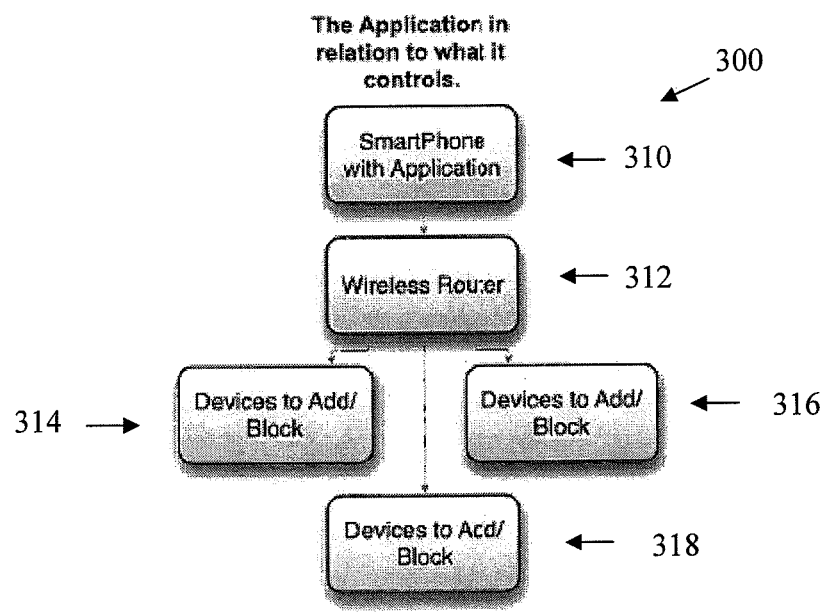
FIG. 3 illustrates an example of the disclosed method (i.e., application) in relation to what it controls in accordance with the present disclosure.

FIG. 3 shows the various devices used in the system 300. A smart phone 310 running a mobile application provides the mobile control of a router 312. The smart phone can also be a tablet or other device that is capable of running application software. The smartphone 310 communicates with router 312 via a mobile internet connection. The mobile internet connection can be any known method, including but not limited to, 3G, 4G, LTE, or WiFi. FIG. 2 also illustrates three devices 314, 316, 318 that are connected to the router 312, which can be controlled via the systems and methods of the current disclosure. Devices 314, 316, 318 can be any device connected to the router, for instance mobile phones, computers, tablets, game consoles, etc. Three devices are shown in this example, but more or fewer devices may be connected to the router and controlled by the systems and methods of the current disclosure.

In accordance with the practices of persons skilled in the art of computer programming, embodiments of the methods are described with reference to operations that are performed by a computer system or a like electronic system such as a mobile application running on a mobile phone or tablet. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in a programmed device or system, the elements of the embodiments may be essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While various embodiments have been described above, it should be understood that those embodiments have been presented by way of example only and are not meant to limit the claims below. Thus, the breadth and scope of the invention should not be limited by the specific embodiments discussed above, but only according to the claims and their equivalents.

I claim:

1. A method of controlling network access of devices connected to a network via a router from a mobile device, said method comprising:
   displaying on a mobile device a list of devices connected to the router;
   receiving input from a user via the mobile device regarding permission of one or more devices to access the network; and
   sending permission information from the mobile device to the router to update the permission of one or more devices to access the network; and
   wherein said steps of receiving the input from the user and sending the permission information from the mobile device include: (1) a first step of selecting a first device from the list of devices displayed on the mobile device, and thereby causing the router to block the first device from accessing the network; and (2) subsequently, a second step of selecting the first device from the list of devices displayed on the mobile device, and thereby causing the router to permit the first device to access the network.

2. The method of claim 1, wherein the permission information includes data disabling a device from connecting to the network via the router.

3. The method of claim 1, wherein the permission information includes data enabling a device to connect to the network via the router.

4. The method of claim 1, wherein the mobile device is a mobile phone, and wherein the mobile phone includes a toggle mechanism, and wherein the toggle mechanism is used to perform the first and second steps of selecting the first device.

5. The method of claim 1, wherein the mobile device is a tablet.

6. The method of claim 1, further comprising receiving identifying information associated with a connected device from a user.

7. The method of claim 1, further comprising before the displaying step: receiving router login information from the user; and verifying the login information.

8. The method of claim 1, further comprising initializing a network connection to allow a device access to the network via the router when the device is first connected to the router.

9. The method of claim 8, wherein initializing the network connection includes adding the newly connected device to a list of allowed devices.

10. A non-transitory computer readable storage medium with an executable program thereon, the program instructing a mobile device to perform the steps of:
    displaying on the mobile device a list of devices connected to a router;
    receiving input from a user via the mobile device regarding permission of one or more devices to access a network via the router; and
    sending permission information from the mobile device to the router to update the permission of one or more devices to access the network; and
    wherein said steps of receiving the input from the user and sending the permission information from the mobile device include: (1) a first step of selecting a first device from the list of devices displayed on the mobile device, and thereby causing the router to block the first device from accessing the network; and (2) subsequently, a second step of selecting the first device from the list of devices displayed on the mobile device, and thereby causing the router to permit the first device to access the network.

11. The non-transitory computer readable storage medium of claim 10, wherein the permission information includes data disabling a device from connecting to the network via the router.

12. The non-transitory computer readable storage medium of claim 10, wherein the permission information includes data enabling a device to connect to the network via the router.

13. The non-transitory computer readable storage medium of claim 10, the program further instructing the mobile device to receive identifying information associated with a connected device from a user.

14. The non-transitory computer readable storage medium of claim 10, the program further instructing the mobile device to: receive router login information from the user; and verify the login information before instructing the mobile device to display the list of devices connected to a router.

15. The non-transitory computer readable storage medium of claim 10, the program further instructing the mobile device to: initialize a network connection to allow a device access to the network via the router when the device is first connected to the router.

16. The non-transitory computer readable storage medium of claim 15, wherein initializing the network connection includes adding the newly connected device to a list of allowed devices.

* * * * *